(No Model.)
F. A. DELAND.
ATTACHMENT FOR LAWN MOWERS.
No. 406,433. Patented July 9, 1889.
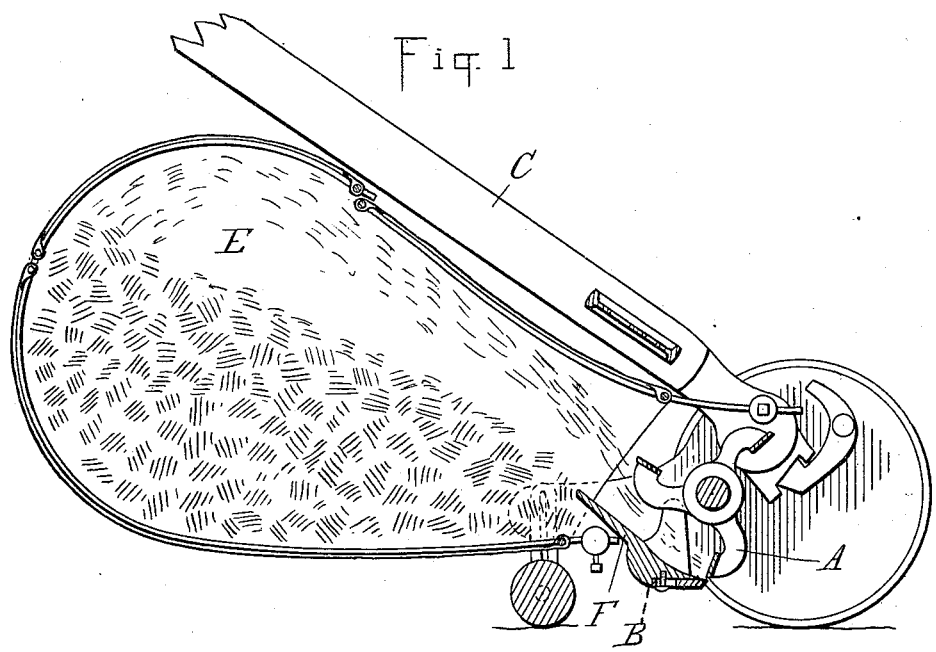
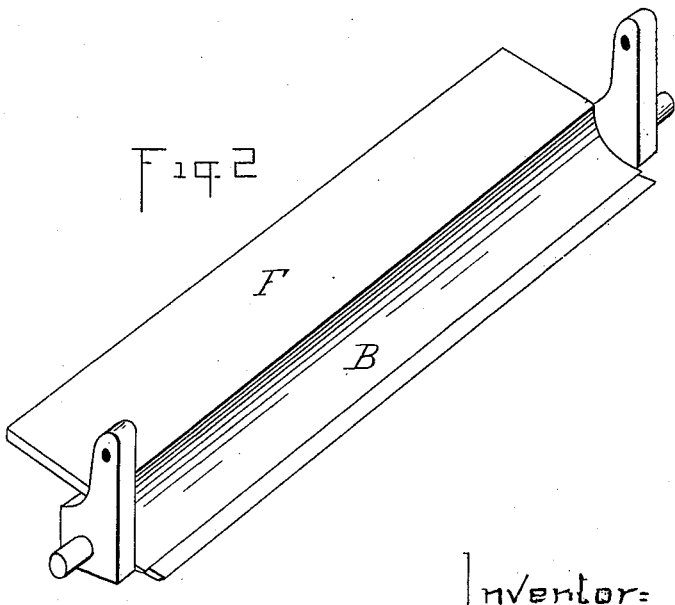
Witnesses:
P. M. Hulbert
J. Paul Mayer
Inventor:
Frank A. Deland
By Thos. S. Sprague & Son
Att'y.

UNITED STATES PATENT OFFICE.

FRANK. A. DE LAND, OF MEMPHIS, MICHIGAN.

ATTACHMENT FOR LAWN-MOWERS.

SPECIFICATION forming part of Letters Patent No. 406,433, dated July 9, 1889.

Application filed March 6, 1889. Serial No. 302,057. (No model.)

*To all whom it may concern:*

Be it known that I, FRANK. A. DE LAND, a citizen of the United States, residing at Memphis, in the county of St. Clair and State of Michigan, have invented certain new and useful Improvements in Attachments for Lawn-Mowers, of which the following is a specification, reference being had therein to the accompanying drawings.

This invention relates to new and useful improvements in attachments for lawn-mowers; and the invention is designed to form an additional improvement on the attachment for lawn-mowers for which I have applied for Letters Patent by my application filed September 28, 1888, Serial No. 286,455.

My improvement consists in the combination of a lawn-mower with a grass-collecting receptacle, as described in the above-mentioned application, and with a shield mounted in the rear of the rotary knives to prevent the grass collected in said receptacle from dropping onto the knives when the receptacle becomes too full or in going downhill, all as more fully hereinafter described, and shown in the accompanying drawings, in which—

Figure 1 is a section of a lawn-mower of known construction and provided with a grass-collecting receptacle secured in the rear thereof, and provided with the shield forming the subject of my improvement. Fig. 2 is a detached perspective view of the shield in connection with the knife-bar, to which it is secured.

In the drawings my invention is illustrated in Fig. 1 in connection with a lawn-mower of well-known construction, and in which A is a rotary knife-head, B the stationary knife-bar, and C the handle. To the frame of this mower is secured a grass-collecting receptacle E, consisting substantially of a cloth-covered wire frame provided with an open mouth and secured in such relation to the rotary knife-head that all the cut grass thrown to the rear is collected in said receptacle. As the bottom of this receptacle is nearly on a level line, as it cannot be dropped very much below the knife-bar on account of the proximity to the ground, the grass collected in the receptacle is liable to fall out through the front or mouth of the receptacle in going downhill, or when too large a body of grass has accumulated in the receptacle, and this falling out will necessarily interfere with the free operation of the rotary knife-head. To obviate this is the object of my improvement, and it is accomplished by means of a shield F, projecting rearwardly from the knife-bar into the receptacle tangentially, or nearly so, to the rotary knife-head. By arranging it in this manner the free delivery of the grass from the rotary knife-head to the rear is not interfered with, and at the same time by projecting the shield above the bottom of the receptacle the grass is estopped from falling out of the receptacle onto the knives. As fresh grass is not a very mobile body, it is obvious that the object of my invention is accomplished by projecting the shield only a little distance into the receptacle.

I preferably construct the shield integrally with the knife-bar B, as shown in the detached perspective in Fig. 2, whereby an unbroken surface is obtained between the knife-bar and the shield to prevent any grass from lodging, so that it may be readily carried or blown into the receptacle.

What I claim as my invention is—

1. The combination, with a lawn-mower, of a grass-collecting receptacle secured in rear thereof, and a shield carried by and extending rearwardly from the knife-bar into said receptacle above the bottom thereof, substantially as described.

2. The combination of the grass-collecting receptacle E and the shield F, rigid with and extending from the rear edge of the stationary knife-bar B into the grass-receptacle and above the bottom of the same, substantially as described.

In testimony whereof I affix my signature, in presence of two witnesses, this 7th day of February, 1889.

FRANK. A. DE LAND.

Witnesses:
J. PAUL MAYER,
A. B. EATON.